(12) United States Patent
Benson et al.

(10) Patent No.: US 7,199,967 B2
(45) Date of Patent: Apr. 3, 2007

(54) METHODS AND APPARATUS FOR TRANSPORTING DATA CARTRIDGES BETWEEN ADJACENT CARTRIDGE LIBRARIES

(75) Inventors: Thomas David Benson, Fort Collins, CO (US); Curtis C. Ballard, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 545 days.

(21) Appl. No.: 10/637,989

(22) Filed: Aug. 8, 2003

(65) Prior Publication Data

US 2004/0032689 A1 Feb. 19, 2004

Related U.S. Application Data

(63) Continuation of application No. 09/950,328, filed on Sep. 10, 2001, now Pat. No. 6,661,602.

(51) Int. Cl.
*G11B 15/68* (2006.01)
(52) U.S. Cl. .................................... 360/92
(58) Field of Classification Search ............... 360/92
See application file for complete search history.

(56) References Cited

U.S. PATENT DOCUMENTS

| | | | |
|---|---|---|---|
| 5,118,664 A | 6/1992 | Burts, Jr. | |
| 5,781,367 A | 7/1998 | Searle et al. | |
| 5,828,645 A | 10/1998 | Kim et al. | |
| 6,011,669 A * | 1/2000 | Apple et al. | 360/92 |
| 6,025,972 A | 2/2000 | Schmidtke et al. | |
| 6,026,063 A | 2/2000 | Ohba et al. | |
| 6,097,566 A | 8/2000 | Heller et al. | |
| 6,438,623 B1 * | 8/2002 | Ryan | 710/2 |
| 6,648,574 B2 * | 11/2003 | Williams | 414/277 |
| 6,693,759 B2 * | 2/2004 | Owens et al. | 360/69 |

FOREIGN PATENT DOCUMENTS

| | | |
|---|---|---|
| EP | 0407305 A2 | 1/1991 |
| EP | 0371707 B1 | 4/1995 |

OTHER PUBLICATIONS

Quantum/ATL, "M1500-Backup That Stacks Up", Mar. 12, 2001, 4 pages.
Adic, "Scalar 234-Scalar 458", 1999, 2 pages.

* cited by examiner

*Primary Examiner*—A. J. Heinz

(57) ABSTRACT

An apparatus and method for transporting data cartridges between cartridge libraries. A data cartridge is received by a data cartridge transport device, pivoted, and then ejected to a cartridge sleeve of a second cartridge library. In one embodiment, the data cartridge transport device includes a pivot assembly; a cartridge sleeve, mounted to the pivot assembly; a cartridge eject mechanism, operably associated with the cartridge sleeve; a drive assembly; and a clutch assembly. The clutch assembly moves between first and second positions, wherein movement of the clutch assembly to the first position engages the pivot assembly with the drive assembly, thereby enabling pivoting of the cartridge sleeve, and wherein movement of the clutch assembly to the second position engages the cartridge eject mechanism with the drive assembly, thereby enabling ejection of a data cartridge from the cartridge sleeve.

7 Claims, 11 Drawing Sheets

FIG. 2  *Prior Art*

METHODS AND APPARATUS FOR TRANSPORTING DATA CARTRIDGES BETWEEN ADJACENT CARTRIDGE LIBRARIES

CROSS-REFERENCE TO RELATED APPLICATIONS

This is a continuation of application Ser. No. 09/950,328 now U.S. Pat. No. 6,661,602 filed on Sep. 10, 2001, which is hereby incorporated by reference herein.

FIELD OF THE INVENTION

The invention pertains to the storage of data cartridges in cartridge libraries, and more particularly, to the integration and expansion of such libraries.

BACKGROUND OF THE INVENTION

There are many types of data storage systems available today. Some of these systems store data cartridges (e.g., DLT cartridges) at known locations, and retrieve desired data cartridges from the known locations so that data may be written to or read from the data cartridges. Such data storage systems are often referred to as "cartridge libraries", particularly if they can accommodate a large number of data cartridges.

A typical cartridge library may include one or more different types of cartridge-receiving devices for holding the library's various data cartridges. One type of cartridge-receiving device may comprise a cartridge storage rack, while another type of cartridge-receiving device may comprise a cartridge read/write device or "drive". The cartridge storage racks serve to provide storage locations for data cartridges that are not currently in use. Often, a cartridge storage rack will be designed to hold a number of cartridge magazines, with each magazine holding a predetermined subset of data cartridges. In this manner, it is easier to add and/or remove data cartridges from a cartridge library.

A cartridge library may also be provided with a movable cartridge-engaging assembly or "picker" for transporting data cartridges between a library's various cartridge-receiving devices (e.g., between cartridge storage racks and cartridge drives). A typical cartridge-engaging assembly may also be provided with a plunge mechanism or "thumb assembly" for engaging the various data cartridges contained in the cartridge-receiving devices and drawing them into the cartridge-engaging assembly. A positioning system associated with the cartridge-engaging assembly may be used to move the cartridge-engaging assembly between the various cartridge-receiving devices.

Cartridge libraries of the type described above are usually connected to a host computer system that reads and writes the data cartridges. For example, if the host computer system issues a request for data contained on a particular data cartridge, a control system associated with the cartridge library will actuate the positioning system to move the cartridge-engaging assembly along the cartridge storage racks until the cartridge-engaging assembly is positioned adjacent a desired data cartridge. The plunge mechanism associated with the cartridge-engaging assembly may then extend, engage the data cartridge, remove the data cartridge from its cartridge storage rack, and then retract to draw the data cartridge into the cartridge-engaging assembly. Thereafter, the positioning system may be actuated to move the cartridge-engaging assembly to an appropriate cartridge drive. Once properly positioned adjacent the cartridge drive, the plunge mechanism may extend to insert the selected data cartridge into the cartridge drive so that the host computer may thereafter read and/or write the data cartridge. After the read/write operation is complete, the plunge mechanism may be actuated to remove the data cartridge from the cartridge drive, and the cartridge-engaging assembly may be actuated to return the data cartridge to its cartridge storage rack.

A cartridge library encompassing many of the above features is disclosed in U.S. Pat. No. 6,025,972 of Schmidtke et al. entitled "Multi-Plane Translating Cartridge Handling System". This patent is hereby incorporated by reference for all that it discloses.

The capacity of a cartridge library may be expanded up to a certain point by filling each of its cartridge storage racks with data cartridges. Often, however, additional storage capacity is needed. Some cartridge libraries, such as the HP Surestore 2/20 series cartridge library (made by Hewlett-Packard Company of Palo Alto, Calif.) holds up to twenty data cartridges. The twenty cartridge capacity is divided among two cartridge storage racks, each of which holds two cartridge magazines, and each magazine of which holds five individual data cartridges. Each of the cartridge storage racks is supported by slides that form the basis of a drawer. To add or remove cartridges from a cartridge library, one of its drawers is opened, a cartridge magazine is added or removed, and the drawer is closed.

Once the capacity of the above-described cartridge library is exceeded, cartridge handling capacity may be increased by stacking additional cartridge library modules on top of the existing module, and then integrating all of the stacked modules to form a single, higher capacity cartridge library. There is a limit, however, to the number of cartridge library modules that may be stacked.

SUMMARY OF THE INVENTION

For the purpose of further increasing the capacity of a cartridge library, the inventors have devised what they believe to be novel methods and apparatus for transporting data cartridges between adjacent cartridge libraries. By transporting data cartridges between adjacent cartridge libraries, the storage capacity of a single cartridge library may be increased by providing access to additional cartridge storage racks and/or additional cartridge drives. In a cartridge library having drives that often sit unused, increasing the number of cartridge storage racks associated with the library can provide for more efficient use of the library's drives. On the other hand, in a cartridge library having drives which are overused, increasing the number of drives associated with the library can provide for more efficient access to the library's data. Even when a library's access to cartridge storage racks and drives are increased in a proportional manner, the mere association of more storage racks and more drives is likely to improve the use of, and access to, a library's components and data.

In a first embodiment of the invention, a data cartridge transport system comprises first and second data cartridge transport devices. The first data cartridge transport device comprises a pivot assembly, a cartridge sleeve that is mounted to the pivot assembly, a cartridge eject mechanism that is operably associated with the cartridge sleeve, and a control system. The control system alternately operates the pivot assembly and the cartridge eject mechanism.

In a second embodiment of the invention, a data cartridge transport device comprises a pivot assembly, a cartridge sleeve that is mounted to the pivot assembly, a cartridge eject mechanism that is operably associated with the cartridge sleeve, a drive assembly, and a clutch assembly. The clutch assembly moves between first and second positions, wherein movement of the clutch assembly to its first position causes the pivot assembly to engage the drive assembly, thereby enabling pivoting of the cartridge sleeve. Movement of the clutch assembly to its second position then causes the cartridge eject mechanism to engage the drive assembly, thereby enabling the ejection of a data cartridge from the cartridge sleeve.

In yet another embodiment of the invention, a method of transporting data cartridges between cartridge libraries comprises receiving a data cartridge stored in a first cartridge library, pivoting the data cartridge, and ejecting the data cartridge to a cartridge sleeve of a second cartridge library.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
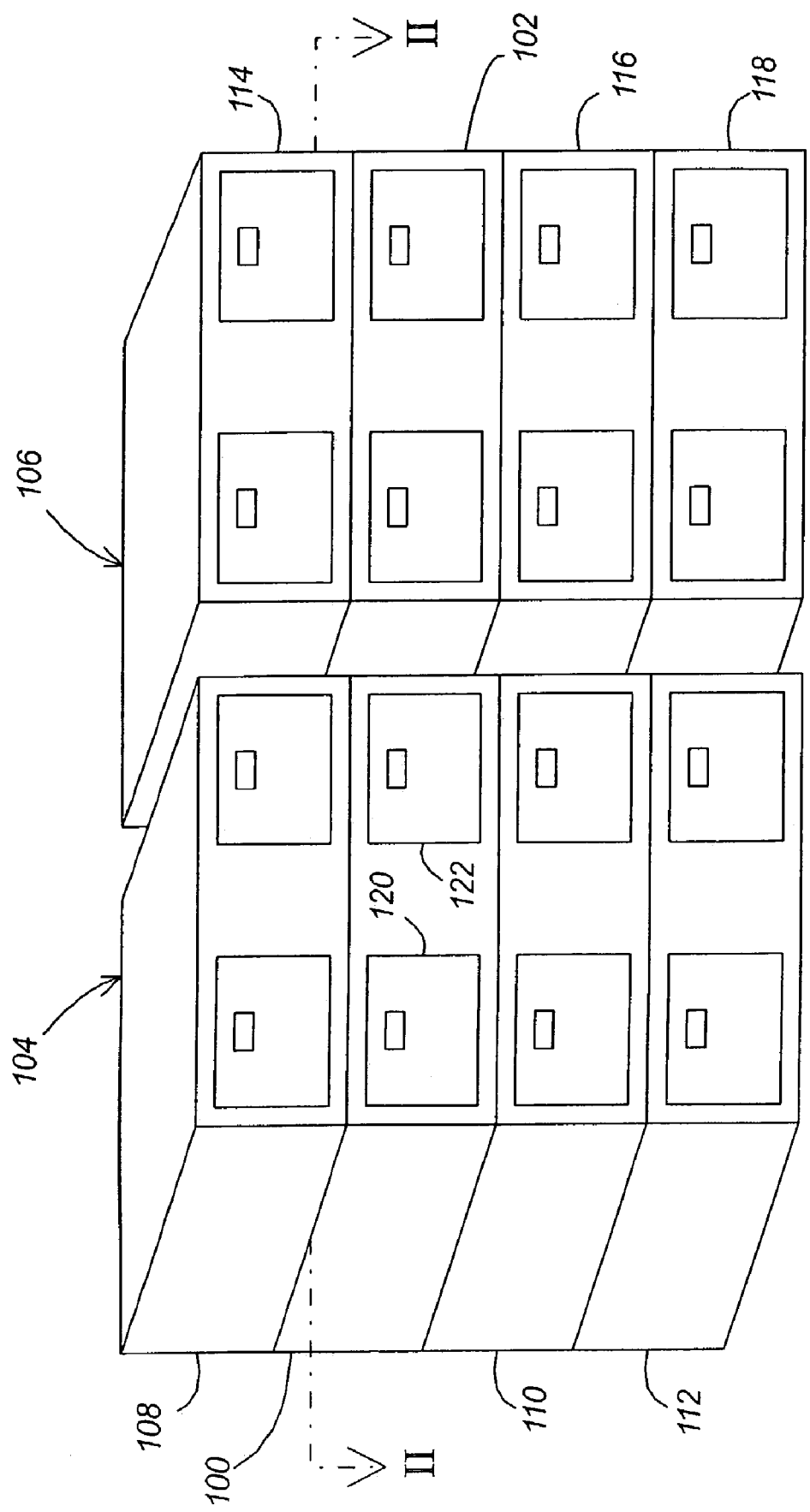
FIG. 1 illustrates two adjacent cartridge libraries.

FIG. 1 illustrates two adjacent cartridge libraries 104, 106. Each cartridge library 104, 106 comprises a number of modules 100, 102, 108–118 that are stacked and integrated to form a single, higher capacity, cartridge library 104, 106. Typically, the number of modules 100, 108–112 that may be stacked to form a single cartridge library 104 is limited to a relatively small number of modules (e.g., seven modules). In FIG. 1, each module 100 comprises two drawers 120, 122, with each drawer 120, 122 holding two cartridge magazines. Each cartridge magazine holds five data cartridges so that each of the FIG. 1 cartridge libraries 104, 106, in turn, holds up to 80 data cartridges (i.e., 4 modules×2 drawers/module×2 magazines/drawer×5 cartridges/magazine). If access to more than the 80 data cartridges held by one cartridge library 104 is desired, an additional cartridge library 106 may be acquired.

A disadvantage of the FIG. 1 library system is that the two adjacent cartridge libraries 104, 106 operate distinctly. For example, each of the cartridge libraries 104, 106 must comprise its own set of drives, even though a library user may only need to access a small number of cartridges at any one time. In addition, access to a particular data cartridge may be limited by the availability of drives in a particular one of the cartridge libraries 104, 106, even though the other cartridge library may have drives that remain unused.

Figure 2:
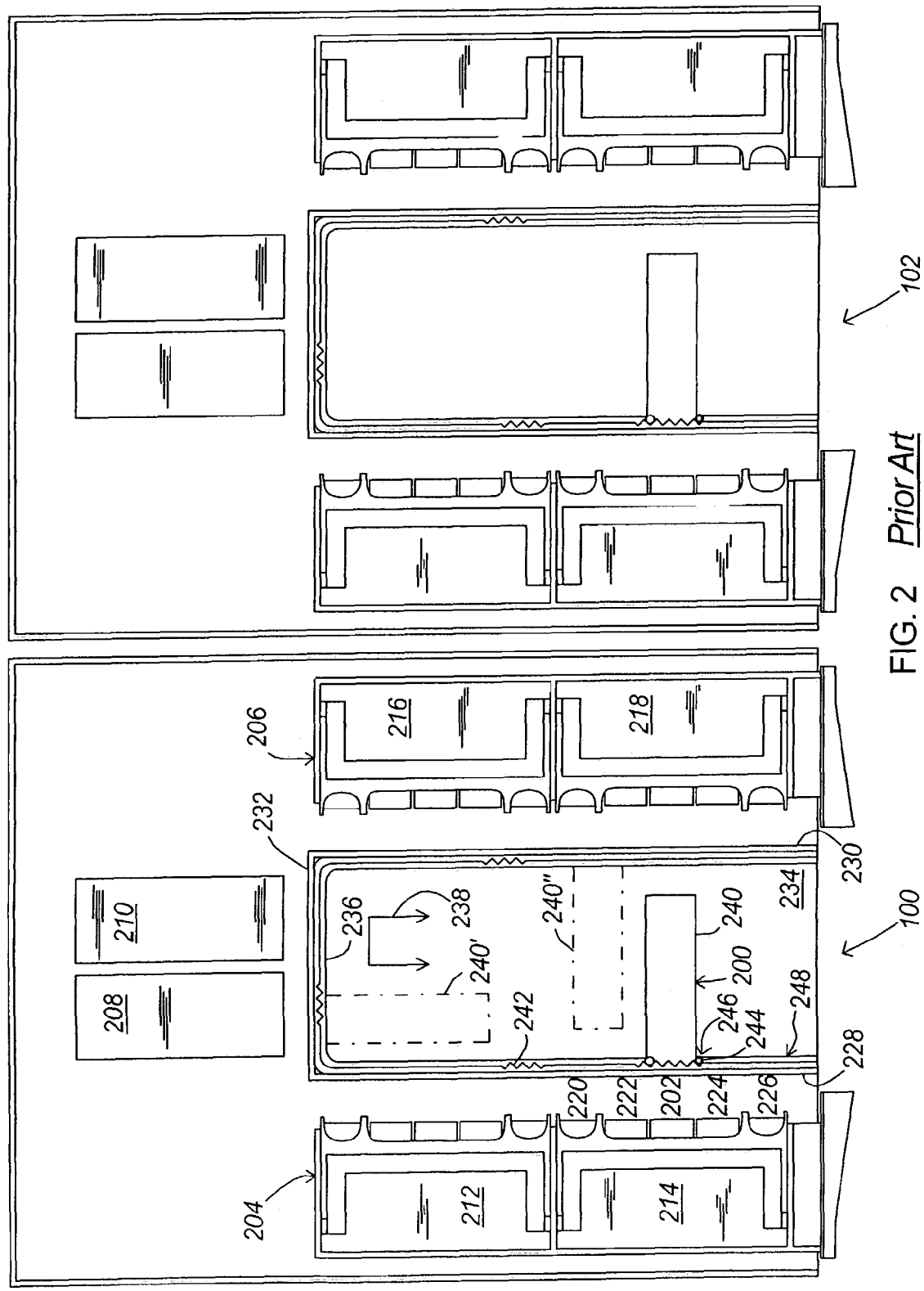
FIG. 2 illustrates a prior art cross-section of the FIG. 1 cartridge libraries, wherein adjacent cartridge library modules function independently from one another.

FIG. 2 illustrates a cross-section of the FIG. 1 cartridge libraries 104, 106, wherein adjacent modules 100, 102 of the cartridge libraries 104, 106 function as independent systems. The modules 100, 102 are shown to be constructed in a similar manner, but they need not be. Each module 100, 102 (or "cartridge library" as they will be hereinafter referred to) may comprise a cartridge-engaging assembly or "picker" 200 for transferring data cartridges 202 between one or more cartridge-receiving devices 204–210 mounted within the cartridge library 100.

The cartridge-receiving devices may comprise one or more cartridge storage racks 204, 206 and one or more cartridge read/write devices or "drives" 208, 210. The cartridge storage racks 204, 206 serve to provide storage locations for data cartridges 202, 220, 222, 224, 226 that are not currently in use.

Often, cartridge storage racks 204, 206 will be designed to hold a number of cartridge magazines 212, 214, 216, 218, with each magazine 212–218 holding a predetermined subset of data cartridges 202, 220–226. In this manner, it is easier to add and/or remove data cartridges 202, 220–226 from a cartridge library 100.

The various cartridge-receiving devices (e.g., the cartridge storage racks 204, 206 and the cartridge read/write devices 208, 210) may be positioned at various locations within a cartridge library 100 so that they define a generally U-shaped configuration.

The cartridge-engaging assembly 200 is adapted to 1) engage a data cartridge 202 contained in a cartridge-receiving device 204–210, and then 2) draw the data cartridge 202 into the cartridge-engaging assembly for transport to a different cartridge-receiving device 204–210. Movement of the cartridge-engaging assembly 200 may be achieved via an actuator system 246 that moves the cartridge-engaging assembly 200 along a U-shaped path of a cartridge positioning system 248.

By way of example, the cartridge positioning system 248 may be of the type shown and described in U.S. Pat. No. 6,025,972 (referred to supra). The cartridge positioning system 248 disclosed therein may comprise a generally rectangularly-shaped structure having a pair of opposed side portions 228 and 230 and an end portion 232. A pair of cartridge storage racks 204, 206 may be positioned adjacent the two opposed sides 228, 230 of the cartridge positioning system 248. Similarly, a pair of cartridge read/write devices 208, 210 may be positioned adjacent the end 232 of the cartridge positioning system 248.

The cartridge positioning system 248 may also comprise a lower plate 234 having a U-shaped guide member or channel 236 formed therein for guiding the cartridge-engaging assembly 200 along a generally U-shaped path 238 so that the cartridge-engaging assembly 200 may access the data cartridges 202, 220–226 contained in the various cartridge storage racks 204, 206 and cartridge read/write devices 208, 210.

As previously stated, the cartridge-engaging assembly 200 may be moved along the U-shaped guide member 236 by an actuator system 246. For example, the actuator system 246 may move the cartridge-engaging assembly 200 between a first position 240 adjacent the first side portion 228 of the positioning system 248, a second position 240' adjacent the end portion 232 of the positioning system 248, and a third position 240" adjacent the second side portion 230 of the positioning system 248 (i.e., the cartridge-engaging assembly 200 may be moved along the generally U-shaped path 238).

The actuator system 246 may comprise a rack-and-pinion drive system having a U-shaped gear rack 242 mounted adjacent the U-shaped guide member 236 in the lower plate 234. A lower pinion gear 244 may be mounted to the cartridge-engaging assembly 200 so that it engages the U-shaped gear rack 242. A suitable drive motor (not shown) may be used to drive the pinion gear 244 and thereby move the cartridge-engaging assembly 200 along the U-shaped path 238.

The foregoing description of a cartridge library 100 and cartridge positioning system 248 is provided so that one may better understand one environment in which the data cartridge transport devices to be described hereafter may be used.

The ability to transport data cartridges between two or more adjacent cartridge libraries 104, 106 would therefore be desirable.

Figure 3:
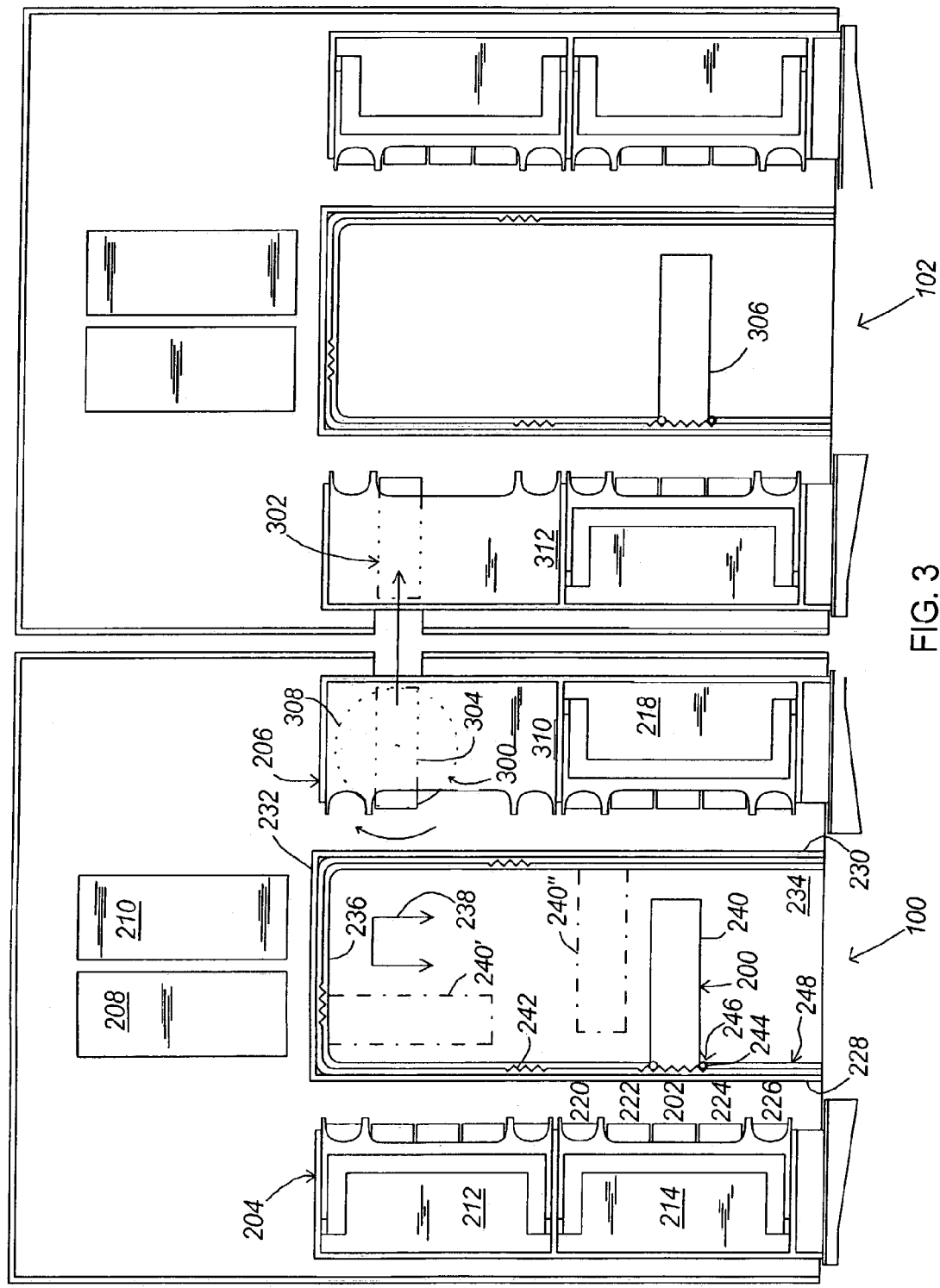
FIG. 3 illustrates a cross-section of FIG. 1 showing the present invention, wherein one of the cartridge libraries comprises a pivoting data cartridge transport device, and the other cartridge library comprises a pass-through cartridge transport device.
Figure 4:
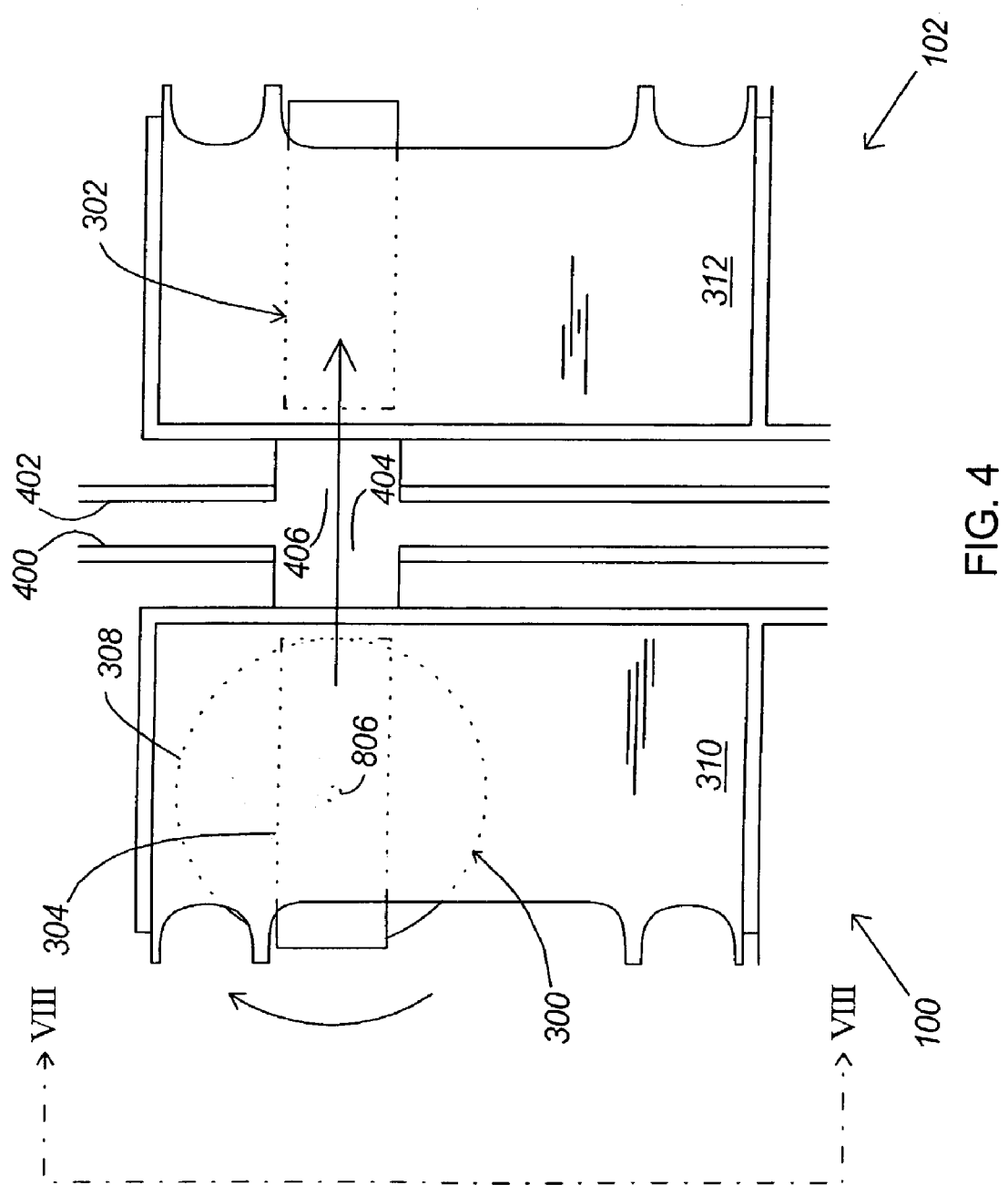
FIG. 4 illustrates an enlarged view of the FIG. 3 data cartridge transport system.

In accordance with the invention, FIG. 3 illustrates an alternative cross-section of the FIG. 1 cartridge libraries 100, 102, wherein one cartridge library 100 has been modified to hold a first data cartridge transport device 300, and the other cartridge library 102 has been modified to hold a second cartridge transport device 302. FIG. 4 illustrates an enlarged view of the FIG. 3 cartridge transport system 300, 302.

In FIGS. 3 & 4, the first data cartridge transport device 300 is a pivoting transport device, and the second data cartridge transport device 302 is a pass-through transport device. In this manner, a data cartridge 202 stored in one of the cartridge libraries 100 may be retrieved by the cartridge-engaging assembly 200, placed in a cartridge sleeve 304 of the first data cartridge transport device 300, pivoted 180 degrees, ejected to the second data cartridge transport device 302, and then accessed by a cartridge-engaging assembly 306 of the other cartridge library 102. The transported data cartridge 202 is pivoted so that it is correctly oriented for engagement by the cartridge-engaging assembly 306 of the library 102 to which it is transported.

The first data cartridge transport device 300 may comprise a pivot assembly 308 and a cartridge sleeve 304. The cartridge sleeve 304 is mounted to the pivot assembly 308 so that it pivots with the pivot assembly 308. In FIGS. 3 & 4, the cartridge sleeve 304 is shown to pivot clockwise. However, the choice of pivot direction (e.g., clockwise or counter-clockwise) is largely arbitrary. A cartridge eject mechanism 800 (shown in FIGS. 8 & 9, but not in FIGS. 3 & 4) is operably associated with the cartridge sleeve 304 so that a data cartridge 202 may be ejected from the cartridge sleeve 304. The data cartridge transport device 300 also comprises a control system 802 (again shown in FIGS. 8 & 9, but not in FIGS. 3 & 4). The control system 802 is provided for alternately operating the pivot assembly 308 and the cartridge eject mechanism 800. Operation of the pivot assembly 308 causes the cartridge sleeve 304 to pivot, whereas operation of the cartridge eject mechanism 800 causes a data cartridge 202 to be ejected from the cartridge sleeve 304. Ejection of a data cartridge 202 from the first data cartridge transport device 300 allows the data cartridge 202 to be received by the second data cartridge transport device 302.

The second data cartridge transport device 302 may be constructed similarly to the first 300, but is preferably constructed as a pass-through device. Since a data cartridge need only be pivoted 180 degrees as it is transported from one cartridge library 100 to another 102, only one of two adjacent cartridge libraries 100, 102 need comprise a pivoting data cartridge transport device 300.

Note that the data cartridge transport system illustrated in FIG. 4 requires the first data cartridge transport device 300 to be an active device. That is, it must be capable of ejecting a cartridge 202 to the second data cartridge transport device 302. However, the second data cartridge transport device 302 may be constructed as either a passive or active device. A passive pass-through device is similar to a typical cartridge storage rack, in that data cartridges must be fully inserted into it, and it has no way of ejecting a data cartridge (i.e., cartridges must be extracted from it using a picker 306 or the like). An active pass-through device, on the other hand, comprises an active cartridge-receiving mechanism for pulling a cartridge into the device, and/or an active cartridge eject mechanism for ejecting a cartridge from the device. An active pass-through device is advantageous in that 1) it may grab a data cartridge which has yet to be fully received into the device, and then pull the cartridge into the device, and/or 2) it may eject a data cartridge to thereby assist in enabling multi-directional cartridge transports (i.e., transport of a cartridge from a first cartridge library 100 to a second 102, and from the second cartridge library 102 to the first 100).

If desired, the second data cartridge transport device 302 shown in FIG. 3 may also be a pivoting device 300. It might be desirable for the second data cartridge transport device 302 to be an active, pivoting device 300 if, for example, uniformity of manufacturing or 2-way cartridge transport is desired.

The data cartridge transport devices 300, 302 shown in FIG. 3 are preferably sized to be held by cartridge storage racks 204, 206, similarly to cartridge magazines 212–218, 310, 312. In this manner, the transport devices 300, 302 may be purchased as accessories for adjacent cartridge libraries 100, 102, and may be inserted into and/or removed from a pair of adjacent cartridge libraries 100,102 as necessary.

As seen more clearly in FIG. 4, holes 404, 406 may need to be cut into the walls 400, 402 of adjacent cartridge libraries 100, 102 so that data cartridges may be passed between the libraries. However, in some cases, these holes 404, 406 may already exist.

Figure 5:
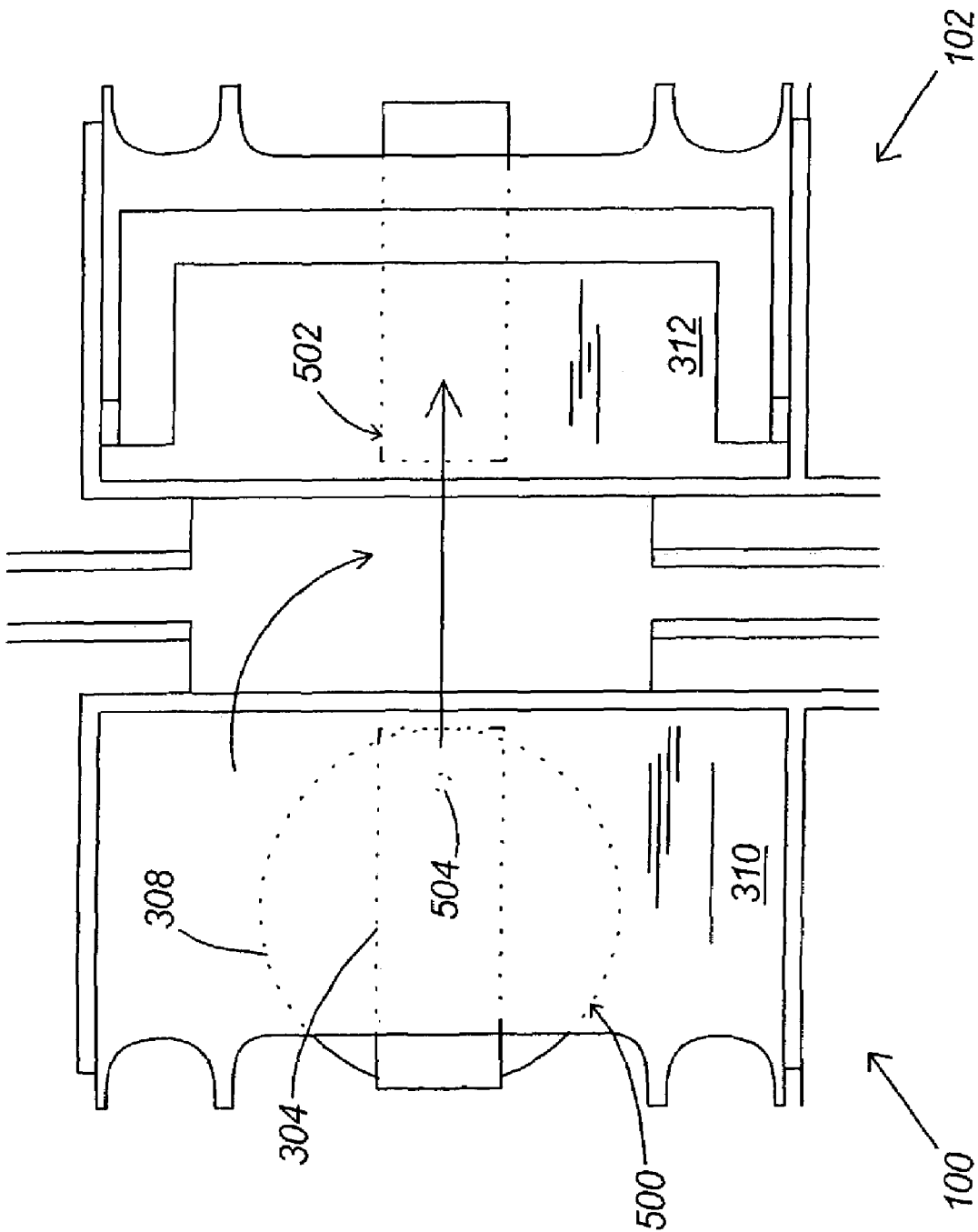
FIG. 5 illustrates a first alternative to the FIG. 4 data cartridge transport system, wherein the pivoting data cartridge transport device comprises an off-center pivot.
Figure 6:
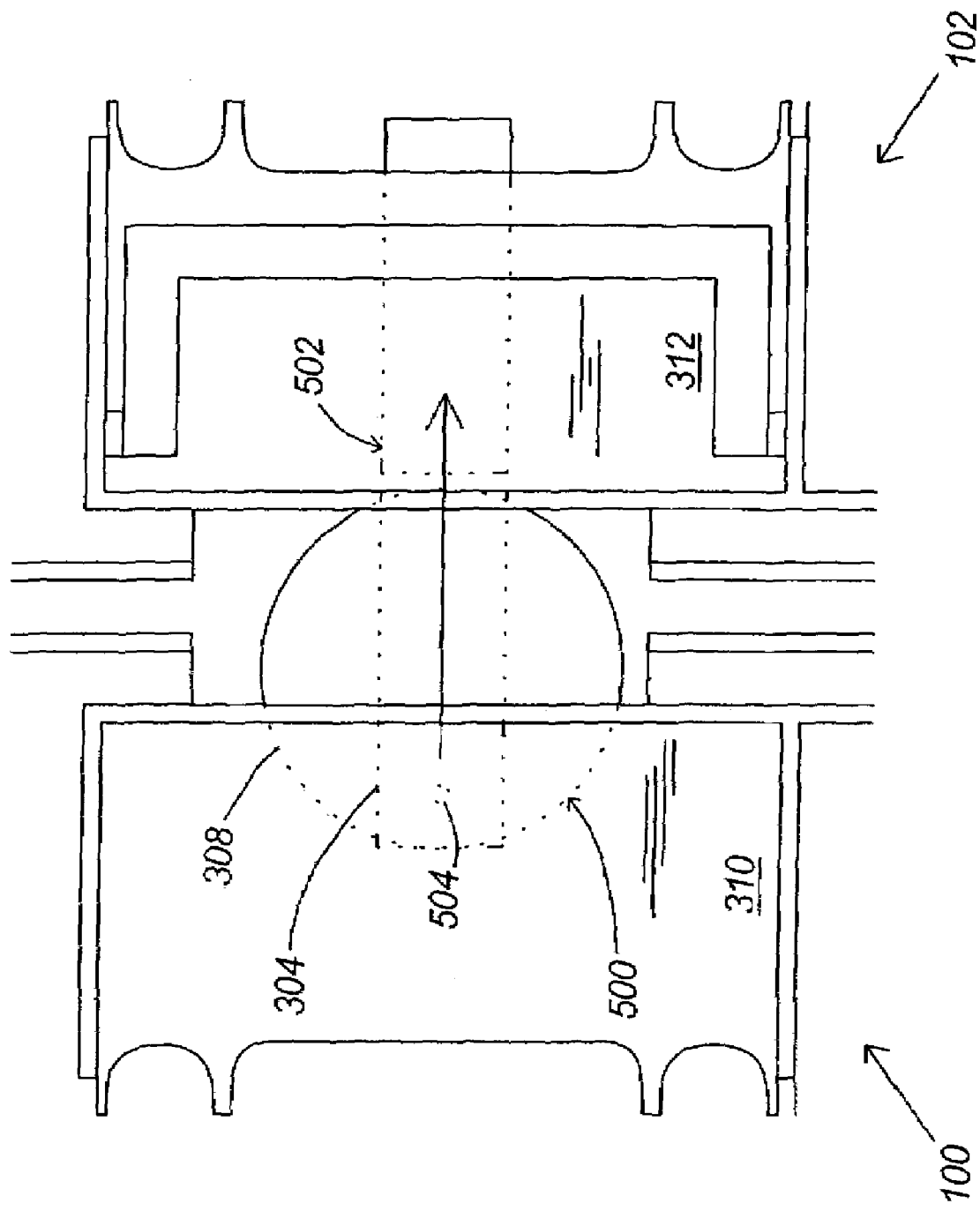
FIG. 6 illustrates an alternate view of the FIG. 5 data cartridge transport system, wherein the pivoting data cartridge transport device has pivoted so as to interface with a pass-through data cartridge transport device.

FIG. 5 illustrates a first alternative to the FIG. 4 data cartridge transport system, wherein the pivoting data cartridge transport device 500 comprises an off-center pivot 504 (i.e., a pivot which is off-center with respect to an axis of the transport device's pivot assembly 308). FIG. 6 shows an alternate view of the FIG. 5 data cartridge transport system, wherein the pivoting data cartridge transport device 500 has pivoted so as to interface with a pass-through data cartridge transport device 502. The arrangement illustrated in FIGS. 5 & 6 is advantageous in instances where only the first data cartridge transport device 500 is active and the second data cartridge transport device 502 is a passive device that is unable to actively receive a cartridge. The FIGS. 5 & 6 arrangement is also advantageous When it is desired to bridge more than a "de minimis" gap between two adjacent cartridge libraries 100, 102. Since the off-center pivot 504 of the first data cartridge transport device 500 enables the cartridge sleeve 304 of the first data cartridge transport device 500 to pivot within a short distance of the second data cartridge transport device 500, the cartridge eject mechanism 800 of the first data cartridge transport device 500 may be used to fully insert a data cartridge 202 into the second data cartridge transport device 502 (or come "close enough" to inserting the data cartridge 202 fully into the second data cartridge transport device 502).

Note in FIG. 5 that if the cartridge-engaging assembly 200 of the second cartridge library 102 (i.e., the library 102 containing the second data cartridge transport device 502) is capable of pushing a cartridge 200 a little more than completely into the second data cartridge transport device 502, then the first data cartridge transport device 500 will be able to grab the cartridge 200 by means of a cartridge-receiving mechanism (e.g., a cartridge eject mechanism 800 operated in a reverse direction).

Figure 7:
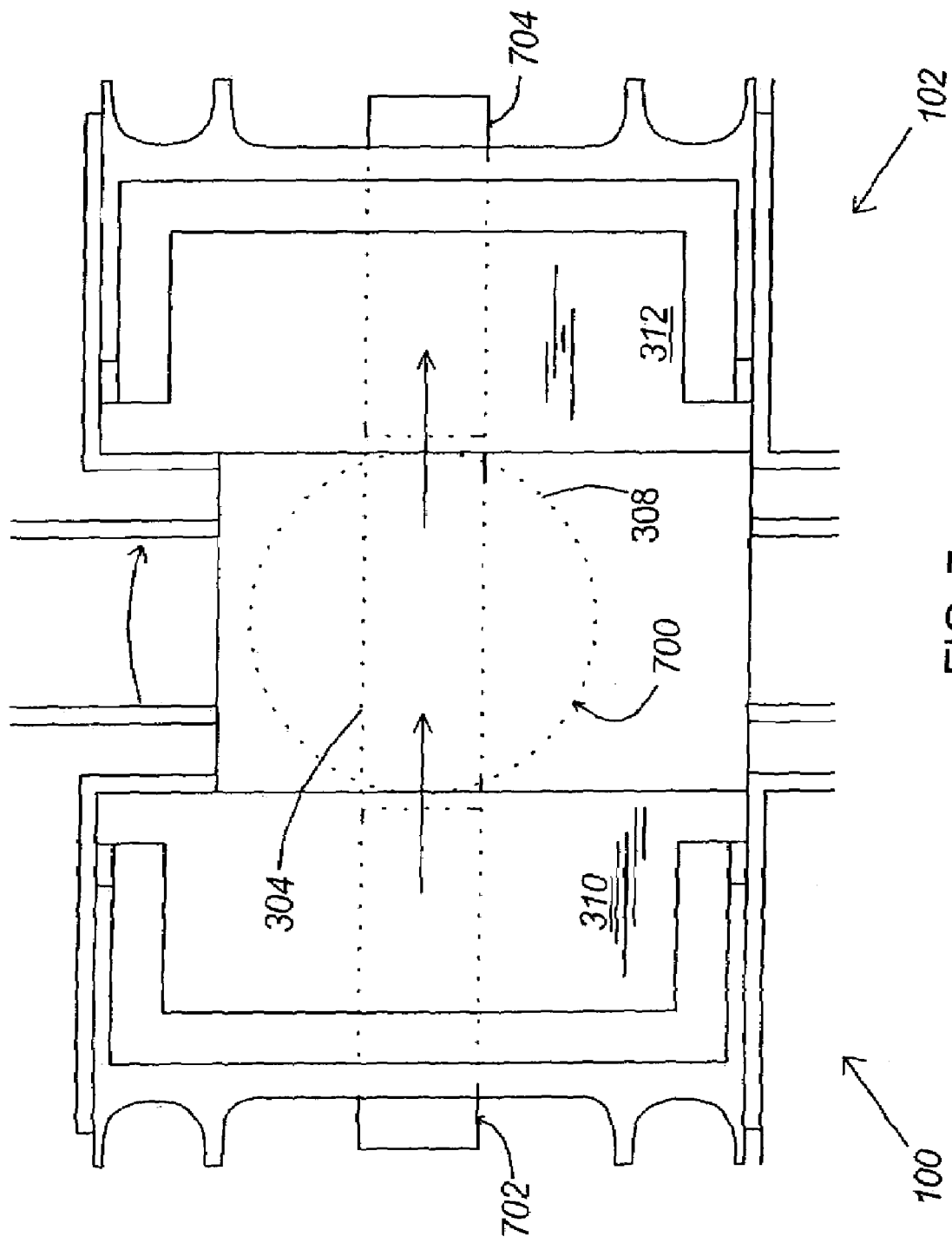
FIG. 7 illustrates a second alternative to the FIG. 4 data cartridge transport system, wherein a pivoting data cartridge transport device is mounted between the two adjacent cartridge libraries, and wherein each of the two adjacent cartridge libraries comprises a pass-through data cartridge transport device.

FIG. 7 illustrates a second alternative to the FIG. 4 data cartridge transport system, wherein a pivoting data cartridge transport device 700 is mounted between two adjacent cartridge libraries 100, 102, and wherein each of the two adjacent cartridge libraries 100, 102 comprises a pass-through data cartridge transport device 702, 704. The pivoting data cartridge transport device 700 is similar to that disclosed in FIGS. 3 & 4, but for the location in which it is mounted. At a minimum, the FIG. 7 apparatus allows data cartridges to be transported from a first cartridge library 100 to a second cartridge library 102. However, if both of the pass-through transport devices are active devices, cartridges may not only be transported from a first cartridge library 100 to a second 102, but also from the second cartridge library 102 to the first 100.

Figure 8:
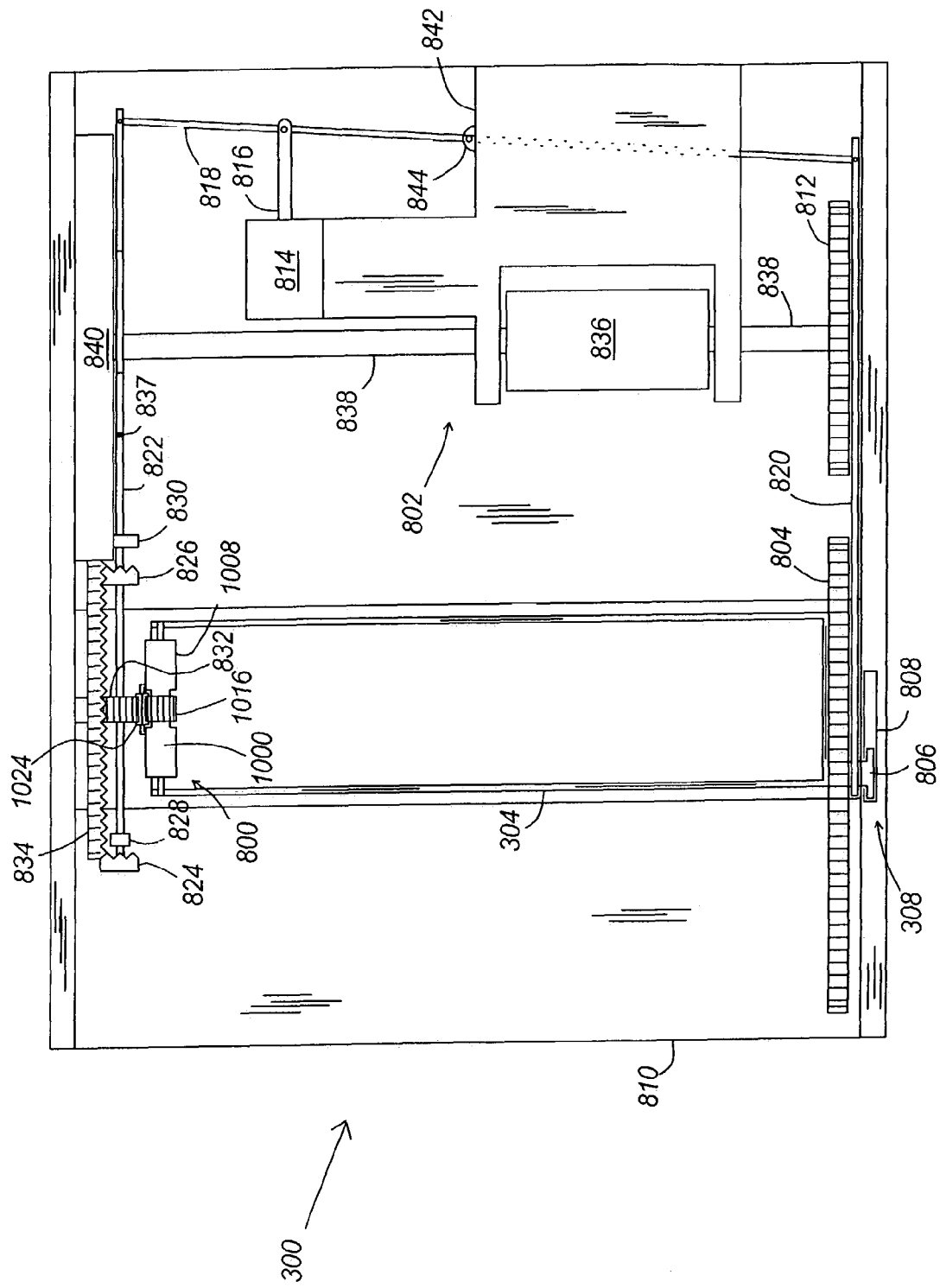
FIG. 8 illustrates (in elevation) a preferred embodiment of the pivoting data cartridge transport device illustrated in FIGS. 3 & 4, wherein the device is in eject mode.
Figure 9:
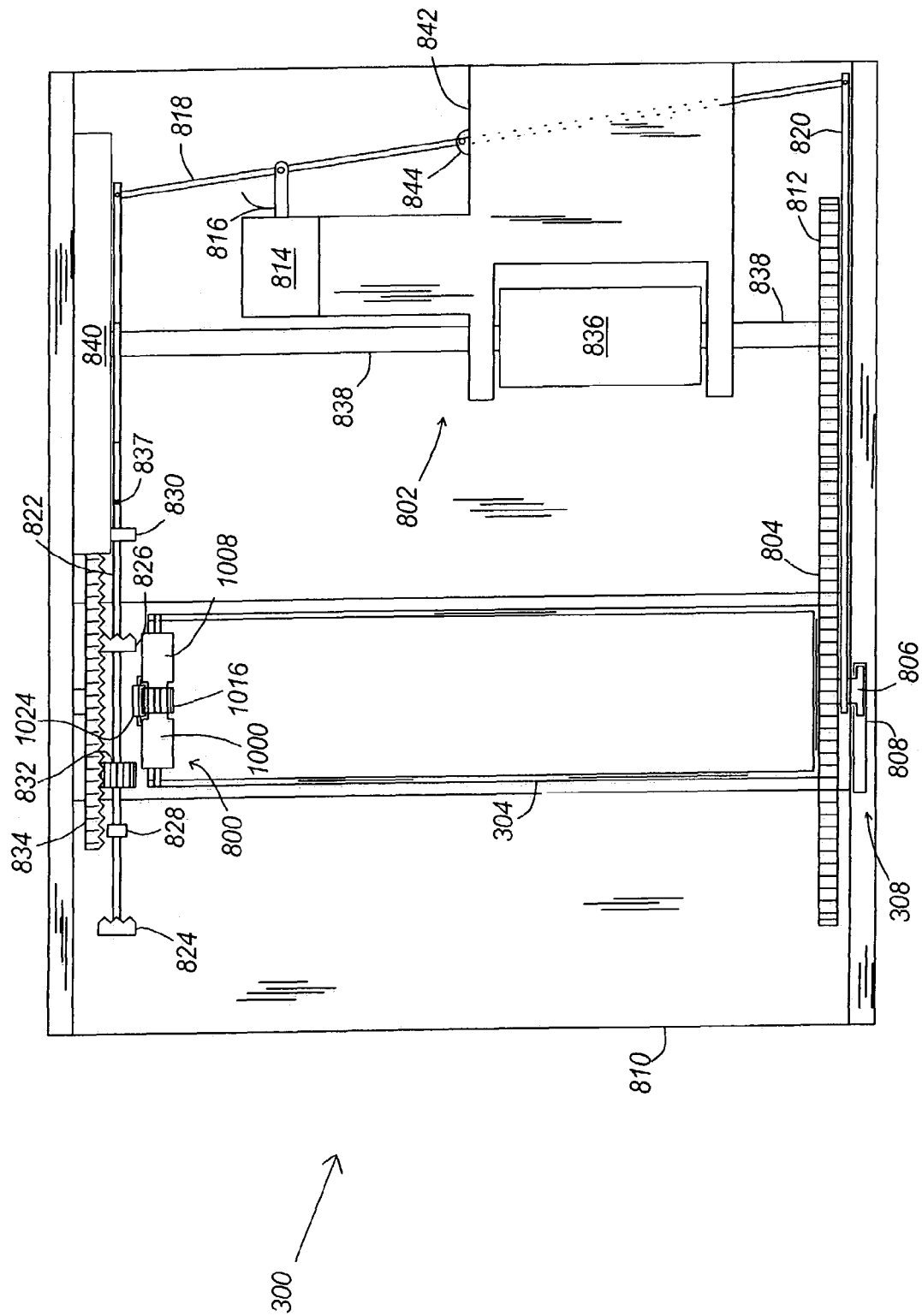
FIG. 9 illustrates the FIG. 8 device in pivot mode.

FIGS. 8 & 9 illustrate (in elevation) a preferred embodiment of the pivoting data cartridge transport device 300 illustrated in FIGS. 3 & 4. In FIG. 8, the device is shown in eject mode. In FIG. 9, the device is shown in pivot mode. The device comprises a pivot assembly 308, a cartridge sleeve 304 (with entry and exit facing perpendicular to figure), a cartridge eject mechanism 800, and a control system 802. The cartridge sleeve 304 is mounted to the pivot assembly 308 so that it pivots with the pivot assembly 308. The cartridge eject mechanism 800 is operably associated with the cartridge sleeve 304 so that it may eject cartridges which are held by the cartridge sleeve 304. The control system 802 is provided for alternately operating the pivot assembly 308 (to thereby pivot the cartridge sleeve 304 and a cartridge held therein) and the cartridge eject mechanism 800 (to thereby eject a cartridge from the cartridge sleeve 304).

In a preferred embodiment, the pivot assembly 308 comprises a pivot gear 804 coupled to a pivot 806. The pivot gear 804 has a plurality of teeth on its circumference. The pivot 804 is preferably of inverted-T cross-section such that it is capable of sliding in a channel 808. The channel 808 may be formed in a housing 810 that is provided for the data cartridge transport device 300.

Figure 12:
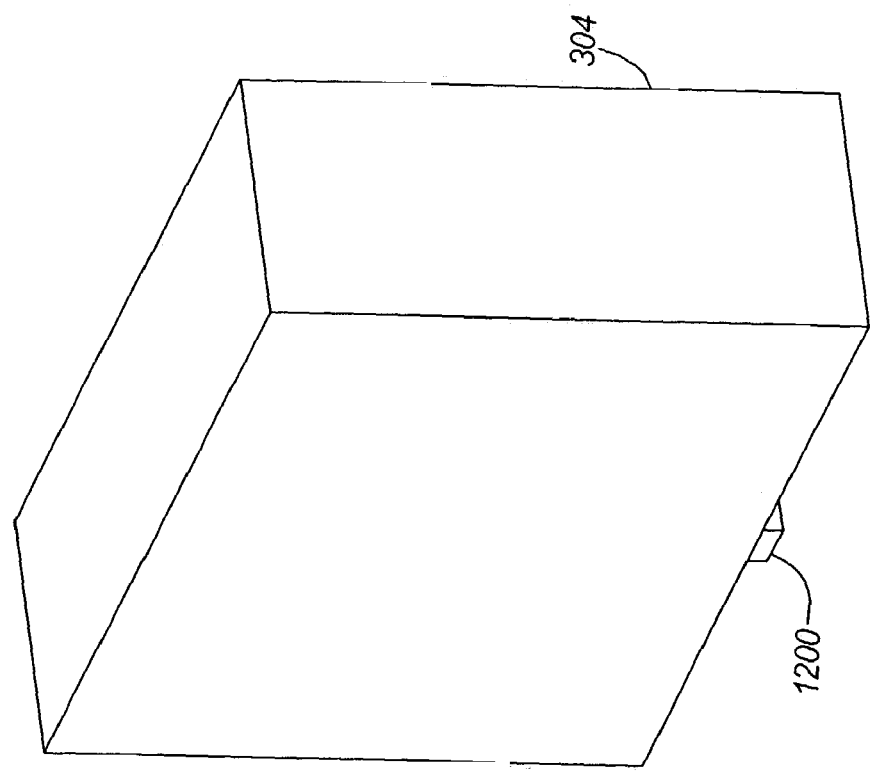
FIG. 12 illustrates a perspective view of the cartridge sleeve blade which slides in the channel of the FIG. 11 pivot gear.
Figure 11:
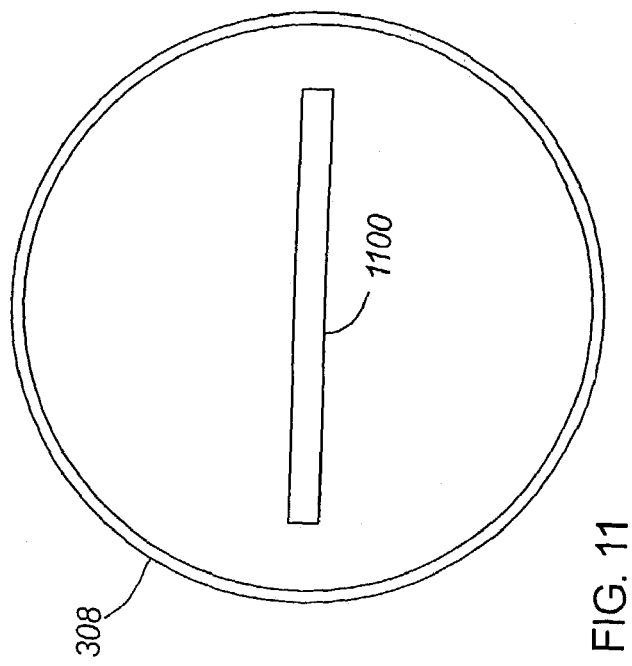
FIG. 11 illustrates a plan view of the pivot gear shown in FIGS. 8 & 9.

Mounted to the pivot gear 804 is the cartridge sleeve 304. As shown in FIGS. 11 & 12, a channel 1100 is cut into the top surface of the pivot gear 804. Within this channel 1100 slides a blade 1200. The blade 1200 is mounted to the underside of the cartridge sleeve 304. When the blade 1200 is fit into the channel 1100, the cartridge sleeve 304 is mounted to the pivot gear 804 in such a manner that the cartridge sleeve 304 will pivot with the pivot gear 804. However, note that the channel 1100 is preferably of greater length than the blade 1200. As a result of this arrangement, the cartridge sleeve 304 may not only be pivoted with the pivot gear 804, but the cartridge sleeve 304 may also slide within the pivot gear 804 (for a purpose which has yet to be described). Alternatively, the cartridge sleeve 304 could comprise a channel, and the pivot gear 804 could comprise a blade.

Figure 13:
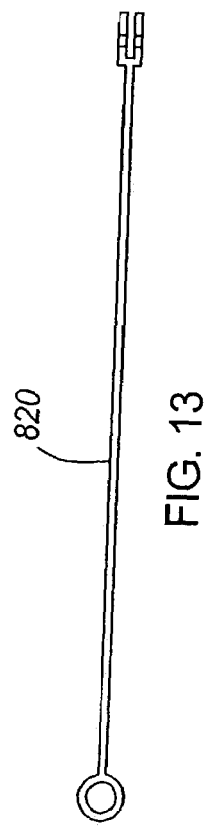
FIG. 13 illustrates a plan view of the noose shown in FIGS. 8 & 9.

In operation, the pivot assembly 308 and cartridge sleeve 304 function as follows. When the pivot 806 of the pivot assembly 308 is slid to a first position within its channel 808, as shown in FIG. 9, the pivot gear 804 is brought into engagement with a drive gear 812 of the control system 802. Operation of the control system 802 therefore causes the pivot gear 804 and cartridge sleeve 304 to pivot. When the cartridge sleeve 304 has been pivoted 180 degrees, the control system 802 stops driving the drive gear 812, and instead operates a clutch assembly 814, 816, 818. By operation of the clutch assembly 814–818, a noose 820 which encircles the pivot 806 of the pivot assembly 308 pushes the pivot 806 and pivot gear 804 away from the control system's drive gear 812 so as to disengage the pivot gear 804 from the drive gear 812 (see FIGS. 8, 9 & 13). When pushed by the noose 820, the pivot 806 migrates toward its second position in the channel 808 of the pivot gear 804, as shown in FIG. 8. Note, however, that the cartridge sleeve 304 preferably does not move to second position, as does the pivot gear 804. This is because the pivot gear 804 is preferably firmly attached to the pivot 806, but the cartridge sleeve is slidably mounted on the pivot gear 804 (i.e., via the channel 808 and blade 1200).

In an alternate clutch arrangement, the pivot gear 804 may be fixedly attached to the cartridge sleeve 304, and the drive gear 812 may be moved so as to disengage the pivot gear 804. The drive gear 812 might be moved in a variety of ways, including, by sliding in relation to the drive shaft 838, or by movement of the drive shaft 838 with respect to the bracket 842 which provides its support.

Figure 10:
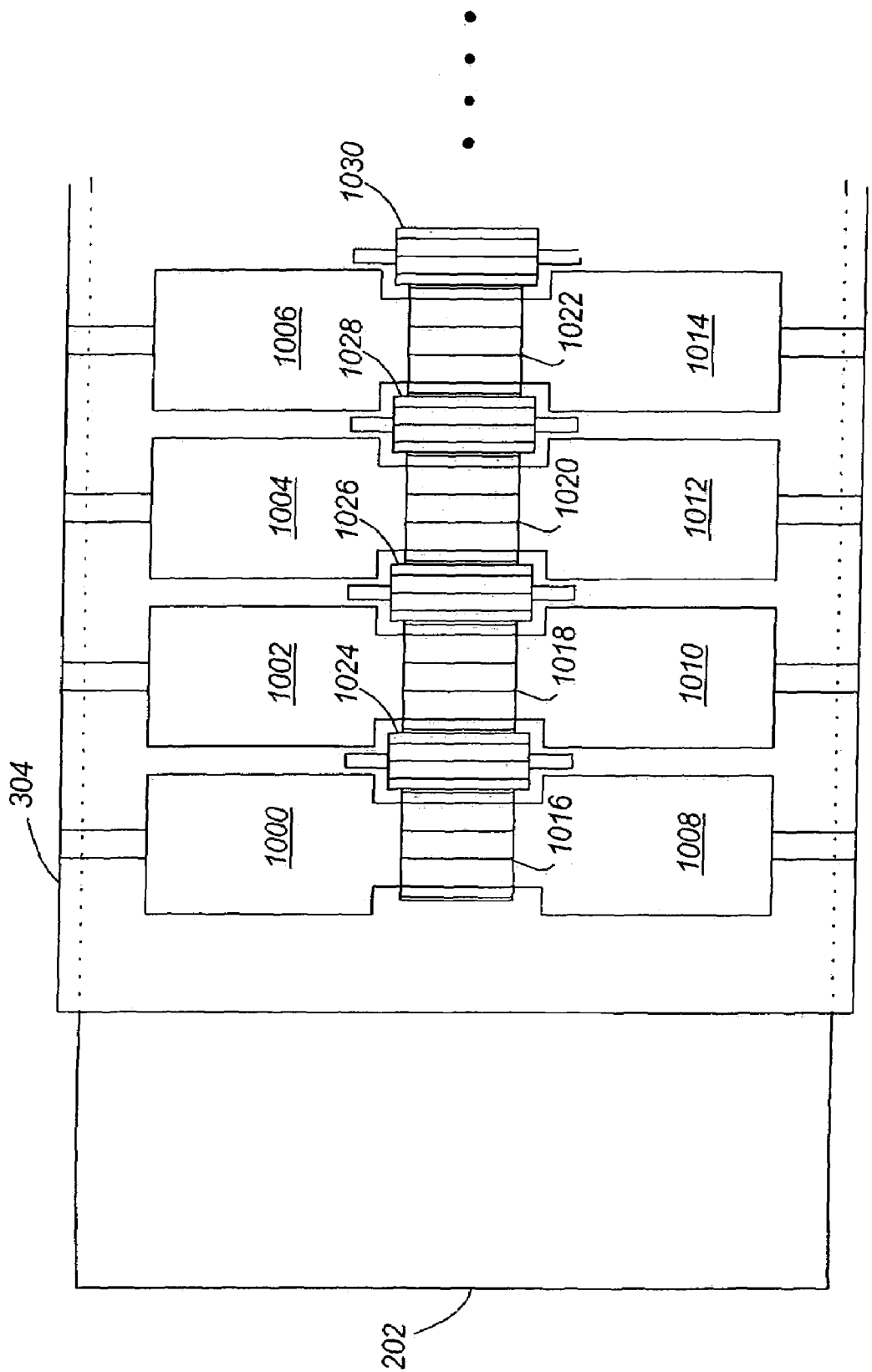
FIG. 10 illustrates an enlarged plan view of the cartridge eject mechanism shown in FIGS. 8 & 9.

The cartridge eject mechanism 800 will now be discussed. As previously mentioned, the cartridge eject mechanism 800 is operably associated with the cartridge sleeve 304 so that it may eject cartridges that are held by the cartridge sleeve 304. In a preferred embodiment, the cartridge eject mechanism 800 is mounted, in part, to the top portion of the cartridge sleeve 304. The portion of the cartridge eject mechanism 800 which is mounted to the top portion of the cartridge sleeve 304 descends into the cartridge sleeve 304 so that it may grip, grab, push or otherwise contact a cartridge 202 which is held by the cartridge sleeve 304 (see especially, FIG. 10). In FIGS. 8–10, the portion of the cartridge eject mechanism 800 which is mounted to the cartridge sleeve 304 comprises a plurality of ejection rollers 1000–1014 and a cartridge ejection gear train 1016–1030. Parts 1016–1022 of the gear train 1016–1030 are fixedly attached to the ejection rollers 1000–1014 so that the gear train 1016–1030 drives the ejection rollers 1000–1014.

Another portion of the cartridge eject mechanism 800 is mounted to the housing 810 in which the data cartridge transport device 300 is mounted. This second portion of the cartridge eject mechanism 800 comprises a drive shaft 822, a pair of drive gears 824, 832, and an idler gear 826. The drive shaft 822 may be supported by a pair of brackets 828, 830 which extend from the transport device's housing 810. One of the drive gears is preferably a pinion gear 824, and is fixedly and axially mounted to the drive shaft 822. The other drive gear 832 preferably has teeth around its circumference, is fixedly and axially mounted to the drive shaft 822, and is able to engage a gear of the cartridge ejection gear train 1016–1030 so as to operate the cartridge ejection gear train when the drive shaft 822 is rotated. The idler gear 826 is axially mounted to the drive shaft 822 in a freewheeling arrangement such that its only purpose is to help align the drive shaft with a drive gear 834 of the control system 802 when the cartridge ejection mechanism 800 is engaged and operated by the control system 802 (FIG. 8).

The drive shaft 822 of the cartridge eject mechanism 800 may be coupled to a clutch assembly 814–818 of the control system 802 via a pivot, slip 837 or the like. In this manner, the drive shaft 822 may turn, yet the clutch assembly 814–818 may slide the drive shaft 822 within its brackets 828, 830 so as to engage or disengage the drive shaft's pinion gear 824 with a drive gear (e.g., a ring gear 834) of the control system 802. FIG. 8 illustrates engagement of the ring and pinion gears 834, 824. FIG. 9 illustrates disengagement of the ring and pinion gears 834, 824. Note that in FIG. 9, not only are the ring and pinion gears 834, 824 disengaged, but the drive gear 832 which operates the cartridge ejection gear train 1016–1030 is disengaged from the gear train 1016–1030.

In the alternate clutch assembly mentioned previously, the drive shaft 822 of the cartridge eject mechanism 800 would necessarily comprise a pinion gear 824 and idler gear 826 which engaged the drive gear 834 from the operate direction (i.e., from the right in FIGS. 8 & 9).

While a preferred embodiment of a cartridge eject mechanism 800 is shown to comprise ejection rollers 1000–1014, a cartridge eject mechanism 800 may alternatively comprise other ejections means, such as an ejection conveyor, an ejection push rod, etc.

A preferred embodiment of a transport device's control system 802 will now be discussed in detail. In FIGS. 8 & 9, the control system 802 illustrated therein comprises a drive assembly 812, 834–840 and a clutch assembly 814–818. The drive assembly 812, 834–840 preferably comprises a single drive motor 836 and a plurality of gears 812, 834, 840, with the single drive motor 836 driving all of the gears 812, 834, 840. Some of the gears 812, 840 are driven via a drive shaft 838 that extends from the drive motor 836. One of the gears 812 that is driven by the drive motor 836 serves to engage and drive the pivot gear 804 when the pivot assembly 308 is engaged with the drive assembly 812, 834–840. Another of the gears 834 which is driven by the drive motor 836 serves to engage and drive the pinion gear 824 of the cartridge eject mechanism 800 when the cartridge eject mechanism 800 is engaged with the drive assembly 812, 834–840. Note that the pivot assembly drive gear 812 is preferably mounted directly to the drive motor's drive shaft 838, whereas the cartridge eject mechanism's drive gear 834 is preferably mounted to the transport device's housing 810. The remaining gears 840 which are driven by the drive motor 836 may serve as a gear ratio conversion assembly. Although FIGS. 8 & 9 only show a gear ratio conversion assembly 840 driving the cartridge eject mechanism 800, such an assembly could also be used for driving the pivot assembly 308.

The drive motor 836 and drive shaft 838 of the drive assembly 812, 834–840 may be supported by a bracket 842 extending from the transport device's housing 810.

The control system 802 may also comprise a clutch assembly 814–818. The clutch assembly 814–818 may in turn comprise a solenoid 814 and a pivot arm 818. The pivot arm 818 is preferably coupled to the solenoid 814, the pivot assembly 308, and the cartridge eject mechanism 800. The pivot arm 818 may be coupled to the solenoid 814 via a plunger 816; the pivot arm 818 may be coupled to the pivot assembly 308 via a noose 820; and the pivot arm 818 may be coupled to the cartridge eject mechanism 800 via a slip 837. The pivot point 844 of the pivot arm 818 may be mounted on a bracket 842 for supporting the solenoid 814, drive motor 836 and drive shaft 838 (with the pivot arm 818 extending through a cavity in the bracket 842).

The clutch assembly 814–818 is movable between first and second positions. The first position is achieved when the solenoid 814 retracts its plunger 816 (see FIG. 9). In this position, 1) the drive shaft 822 of the cartridge eject mechanism 800 is disengaged from the control system's drive assembly 812, 834–840, and 2) the pivot gear 804 of the pivot assembly 308 is engaged with the control system's drive assembly 812, 834–840. In this position, the cartridge sleeve 304 may be pivoted.

The second position of the clutch assembly 814–818 is achieved when the solenoid 814 extends its plunger 816 (see FIG. 8). In this position, 1) the drive shaft 822 of the cartridge eject mechanism 800 is engaged with the control system's drive assembly 812, 834–840, and 2) the pivot gear 804 of the pivot assembly 308 is disengaged from the control system's drive assembly 812, 834–840. In this position, a cartridge 202 may be ejected from the cartridge sleeve 304.

The drive motor 836 and solenoid 814 may be powered by a backplane (not shown) to which other electronics of a cartridge library 100 are connected.

One should now appreciate how the alternate driving of a pivot assembly 308 and a cartridge eject mechanism 800 enables the transport of a data cartridge 202 between cartridge libraries.

What is claimed is:

1. A data cartridge transport system, comprising:
    a first data cartridge transport device mounted within a first cartridge library, comprising:
        a pivot assembly;
        a cartridge sleeve, mounted to said pivot assembly;
        a cartridge eject mechanism, operably associated with said cartridge sleeve;
        a drive assembly; and
        a control system, said control system alternately engaging said pivot assembly and said drive assembly to thereby pivot said cartridge sleeve, and engaging said cartridge eject mechanism and said drive assembly to thereby eject a data cartridge from said cartridge sleeve; and
    a second data cartridge transport device for receiving a data cartridge ejected from said first data cartridge transport device, and for providing access to the data cartridge to a cartridge picker of a second cartridge library.

2. A data cartridge transport system as in claim 1, wherein said second data cartridge transport device comprises:
    a second cartridge sleeve; and
    an active cartridge-receiving mechanism, operably associated with said second cartridge sleeve.

3. A data cartridge transport system as in claim 1, wherein said second data cartridge transport device comprises:
    a second cartridge sleeve; and
    an active cartridge eject mechanism, operably associated with said second cartridge sleeve.

4. A data cartridge transport system, comprising:
a first data cartridge transport device mounted within a first cartridge library, the first data cartridge transport device comprising:
- a pivot assembly;
- a cartridge sleeve, mounted to said pivot assembly;
- a cartridge eject mechanism, operably associated with said cartridge sleeve; and
- a control system, said control system alternately operating said pivot assembly to thereby pivot said cartridge sleeve, and operating said cartridge eject mechanism to thereby eject a data cartridge from said cartridge sleeve; and a second data cartridge transport device mounted within a second cartridge library, for receiving a data cartridge ejected from said first data cartridge transport device.

5. A data cartridge transport system, comprising:
a first data cartridge transport device, mounted between first and second cartridge libraries and thereby enabling transport of a data cartridge from the first cartridge library to the second cartridge library, the first data cartridge transport device comprising:
- a pivot assembly;
- a cartridge sleeve, mounted to said pivot assembly;
- a cartridge eject mechanism, operably associated with said cartridge sleeve; and
- a control system, said control system alternately operating said pivot assembly to thereby pivot said cartridge sleeve, and operating said cartridge eject mechanism to thereby eject a data cartridge from said cartridge sleeve;

a second data cartridge transport device, mounted within the second cartridge library, for receiving a data cartridge ejected from said first data cartridge transport device; and a third data cartridge transport device, mounted within the first cartridge library, comprising:
- an additional cartridge sleeve; and
- an active cartridge eject mechanism, operably associated with said additional cartridge sleeve.

6. A data cartridge transport system, comprising:
a first data cartridge transport device comprising:
- a pivot assembly;
- a cartridge sleeve, mounted to said pivot assembly;
- a cartridge eject mechanism, operably associated with said cartridge sleeve; and
- a control system, said control system alternately operating said pivot assembly to thereby pivot said cartridge sleeve, and operating said cartridge eject mechanism to thereby eject a data cartridge from said cartridge sleeve;
- wherein said pivot assembly comprises a pivot that is off-center with respect to an axis of said cartridge sleeve; and a second data cartridge transport device for receiving a data cartridge ejected from said first data cartridge transport device.

7. A method of transporting data cartridges between cartridge libraries, comprising:
receiving a data cartridge stored in a first cartridge library;
pivoting the data cartridge; and
ejecting the data cartridge to a cartridge sleeve of a second cartridge library.

* * * * *